F. O. JAQUES, Sr.
MICROMETER CALIPERS.
APPLICATION FILED MAR. 27, 1916.
1,235,478.
Patented July 31, 1917.
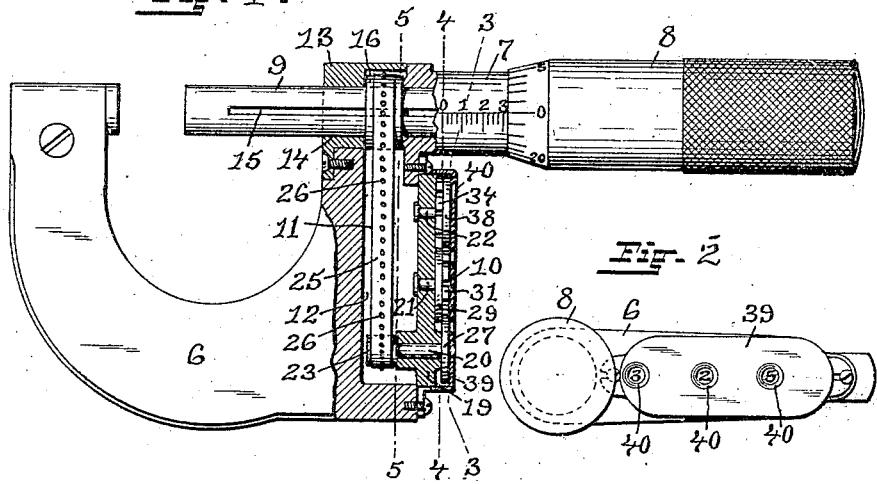
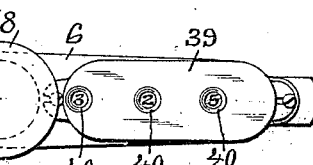
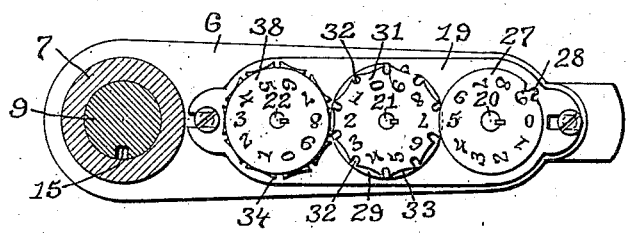
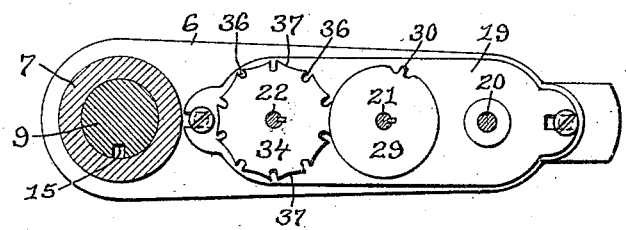
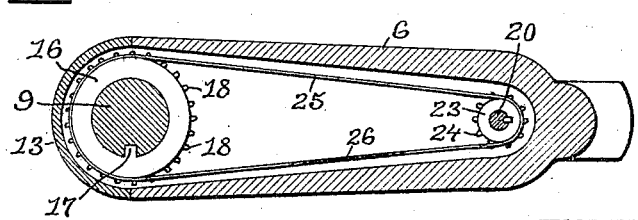
INVENTOR:
Fernando Oscar Jaques, Sr.,
by Chas. H. Luther
ATTORNEY.

UNITED STATES PATENT OFFICE.

FERNANDO OSCAR JAQUES, SR., OF CRANSTON, RHODE ISLAND.

MICROMETER-CALIPERS.

1,235,478. Specification of Letters Patent. Patented July 31, 1917.

Application filed March 27, 1916. Serial No. 87,092.

*To all whom it may concern:*

Be it known that I, FERNANDO OSCAR JAQUES, Sr., a citizen of the United States, residing at Cranston, in the county of Providence and State of Rhode Island, have invented a new and useful Improvement in Micrometer-Calipers, of which the following is a specification.

This invention has reference to an improvement in instruments of precision and more particularly to an improvement in micrometer-calipers known as easy reading micrometers.

In micrometer-calipers it is essential that the spindle be turned with the least amount of friction, so that the operator may know, by the sense of touch, the instant the end of the spindle touches the work. In easy reading micrometer-calipers having a measuring indicating mechanism in the form of a counting or cyclometer mechanism and operated by the spindle, through a train of spur or bevel gears, too much friction is created, and this is particularly so between the spindle and the measuring indicating mechanism.

The object of my invention is to improve the construction of a micrometer-caliper having a measuring indicating mechanism operated by the spindle, whereby all friction and particularly friction between the spindle and the indicating mechanism, is reduced to a minimum.

Further objects of my invention are to improve the construction and reduce the cost of manufacturing the above form of micrometer-calipers.

My invention consists in the peculiar and novel construction of a micrometer-caliper having a measuring indicating mechanism on the frame and operated from the spindle, and other details of construction, as will be more fully set forth hereinafter and claimed.

Figure 1, is a side view of my improved easy reading micrometer-caliper showing the same partly in section.

Fig. 2, is an end view of the micrometer, showing a face view of the measuring indicating mechanism.

Fig. 3, is an enlarged transverse sectional view as indicated by line 3. 3. in Fig. 1, showing the faces of the indicating disks.

Fig. 4, is an enlarged transverse sectional view as indicated by line 4. 4. in Fig. 1, showing the under operating disks of the indicating mechanism, and Fig. 5, is an enlarged transverse sectional view as indicated by line 5. 5. in Fig. 1, showing the means for operatively connecting the spindle with the measuring indicating mechanism.

In the drawing 6 indicates the U shape frame of the micrometer caliper, 7 the barrel, 8 the thimble, 9 the spindle, 10 the measuring indicating mechanism and 11 the means operatively connecting the spindle 9 with the indicating mechanism 10. The frame 6 has a cavity 12 extending in from the edge and is shaped to support the indicating mechanism 10. The spindle end of the cavity 12 is closed by a fitting 13, secured to the frame and having a hole 14 through which the spindle 9 extends. The barrel 7 and the end of the thimble 8 have the usual graduations. The spindle 9 has the usual forty pitch screw-threads, screw-threaded through the inner end of the barrel 7, not shown, and in addition a longitudinal groove 15. A pin gear 16 on the spindle 9 has a tongue 17 in the groove 15, and twenty-five pins 18. 18. This pin gear 16 rotates with the spindle 9 but is held from longitudinal movement by the frame 6 and fitting 13. The measuring indicating mechanism 10 has a base 19 adjustably secured to the frame 6 by screws through slots in the base and closes the cavity 12 in the frame 6. This base 19 has three bearings which rotatably support shafts 20, 21 and 22. On the inner end of the shaft 20 is secured a pin gear 23 having ten pins 24. 24. and is operatively and positively connected to the pin gear 16 by a continuous thin flexible metal band 25, preferably of steel and having a continuous central series of pin holes 26. 26, which coincide with and through which the pins on the pin gears extend and engage with the band, as shown in Figs. 1 and 5, thereby positively connecting the band with the pin gears. To the outer end of the shaft 20 is secured an indicating disk 27 having a peripheral finger 28, and numerals 0 to 9, on its face. An under disk 29 having a peripheral finger 30 and an outer disk 31 having a series of ten peripheral notches 32. 32. into which the finger 28 on the disk 27 engages, a series of ten inwardly curved peripheral portions 33. 33 which engage with the periphery of the disk 27 and numerals 0 to 9 in its face, are secured to the outer end of the shaft 21. An under disk 34 having a series of ten peripheral notches 36. 36 into which the finger 30 of the disk 29 engages and a series of ten inwardly curved peripheral portions 37. 37 which engage with the periphery of the disk 29 and an outer indicating disk 38 having numerals 0 to 9 on its face, are secured to the outer end of the shaft 22. A cover 39 having sight openings 40. 40. is secured to the base 19 over the indicating disks, as shown in Figs. 1 and 2.

In the operation of my improved micrometer caliper the spindle 9 may be turned in either direction. After the spindle has been revolved thirteen complete turns to the left, the reading would be, three hundred and twenty-five one thousandths of an inch, as shown in Figs. 1 and 2. With the reading at zero one complete turn of the spindle 9 to the left will revolve the pin gear 23 two and one half revolutions, the reading would then be twenty-five one thousandths of an inch or each one twenty-fifth of a revolution of the spindle 9 will revolve the indicating disk 27 one tenth of a revolution. On each complete revolution of the disk 27 the finger 28 will engage with a notch 32 in the disk 31 and revolve the disk 31 one tenth of a revolution, when the periphery of the disk 27 will engage with a curved peripheral portion 33 of the disk 31 and hold the disk 31 from turning, and on one complete revolution of the disks 29 and 31 the finger 30 on the disk 29 will engage with a notch 36 in the disk 34 and revolve the disk 34 and disk 38 one tenth of a revolution, when the periphery of the disk 29 will engage with a curved peripheral portion 37 of the disk 34 and hold the disks 34 and 38 from turning.

By the peculiar and novel construction of my improved micrometer caliper, friction is reduced to a minimum, particularly between the spindle and the measuring indicating mechanism and the location of the sight openings through which the readings are seen are particularly advantageous in calipering work in lathes or for any work in which the caliper would be held in an upright position.

Having thus described my invention I claim

1. A micrometer caliper comprising a frame, a spindle through the frame and having a longitudinal groove, a pin gear on the spindle and having a tongue in the spindle groove, means for holding the pin gear against longitudinal movement in the frame, a measuring indicating mechanism in the form of a counting mechanism on the frame, a pin gear operatively connected with the measuring indicating mechanism and an endless thin metal band operatively connected with the pin gear on the spindle and with the pin gear on the measuring indicating mechanism.

2. A micrometer caliper comprising a frame, a spindle through the frame, and having a longitudinal groove, a pin gear on the spindle and having a tongue in the spindle groove, means for holding the pin gear against longitudinal movement in the frame, a measuring indicating mechanism in the form of a counting mechanism on the frame, a pin gear operatively connected with the measuring indicating mechanism and an endless thin metal band having a continuous series of holes and operatively connected with the pin gears by the pins on the pin gears engaging with the band through the holes in the band.

3. A micrometer caliper comprising a frame having a cavity, a barrel on the frame, a spindle through the barrel and having a longitudinal groove, a thimble on the spindle, a fitting secured to the frame and closing the spindle end of the cavity, a pin gear on the spindle and having a tongue in the spindle groove, and held from longitudinal movement in the frame, a measuring indicating mechanism having a base adjustably secured to the frame and closing the cavity in the frame, bearings in the base rotatably supporting an outer, an intermediate and an inner located shaft, a pin gear on the inner end of the outer shaft, a thin endless metal band having a continuous series of holes and operatively connecting the pin gear on the spindle with the pin gear on the outer shaft, an indicating disk on the outer shaft having a peripheral finger and numerals on its face, an under disk having a peripheral finger and an outer disk having a series of notches, a series of inwardly curved peripheral portions and numerals on its face, secured to the intermediate shaft, an under disk having a series of peripheral notches and a series of inwardly curved peripheral portions and an outer disk having numerals on its face secured to the inner shaft, and a cover having sight openings secured to the base.

In testimony whereof, I have signed my name to this specification.

FERNANDO OSCAR JAQUES, Sr.

Copies of this patent may be obtained for five cents each, by addressing the "Commissioner of Patents, Washington, D. C."